United States Patent [19]

Shiba

[11] Patent Number: 4,669,359
[45] Date of Patent: Jun. 2, 1987

[54] POSITIONING SYSTEM

[75] Inventor: Kazuo Shiba, Tokorozawa, Japan

[73] Assignee: Citizen Watch Co., Ltd., Tokyo, Japan

[21] Appl. No.: 719,218

[22] Filed: Apr. 2, 1985

[30] Foreign Application Priority Data

Apr. 4, 1984 [JP] Japan .................. 59-67225

[51] Int. Cl.$^4$ ...................... F15B 13/16; G05B 11/18
[52] U.S. Cl. ..................... 91/361; 318/593; 318/640; 82/27
[58] Field of Search ............ 91/55, 361, 459; 74/89.15; 82/27; 409/151, 153, 155, 164, 174; 408/13; 318/592, 593

[56] References Cited

U.S. PATENT DOCUMENTS

| | | | |
|---|---|---|---|
| 3,983,467 | 9/1976 | Bossons et al. | 318/593 |
| 3,995,206 | 11/1976 | Aronstein et al. | 318/593 |
| 4,282,469 | 8/1981 | Moriyama | 318/640 |
| 4,315,199 | 2/1982 | Kyomasu et al. | 318/640 |
| 4,513,782 | 4/1985 | Contartese et al. | 91/361 |

FOREIGN PATENT DOCUMENTS 0155142  9/1983  Japan ...................... 82/27

Primary Examiner—Larry Jones
Attorney, Agent, or Firm—Birch, Stewart, Kolasch & Birch

[57] ABSTRACT

A system for positioning a movable body for a processing machine. A lead screw is rotatably and axially shiftably supported and engaged with the movable body. The lead screw is rotated by a motor to move the movable body. A hydrostatic thrust bearing is provided for preventing axial movement of the lead screw. The lead screw is finely moved in the axial direction by controlling the pressure difference of oil supplied to the thrust bearing to position the movable body.

7 Claims, 2 Drawing Figures

POSITIONING SYSTEM

BACKGROUND OF THE INVENTION

The present invention relates to a positioning system employed in a processing machine and others.

A positioning device employed in the processing machine is desired to perform a speedy and precise positioning. Particularly, in a super-precision process and a semiconductor manufacturing device, it is necessary to perform a positioning in the unit of submicrons.

There has been a positioning system employed with a lead screw as a positioning mechanism. The lead screw is driven by a motor such as a pulse motor or a DC motor. The precision of the positioning by the pulse motor is decided by a minimum quantity of the feeding (a unit feed length) of the pulse motor.

In the positioning system with the lead screw driven by the pulse motor, the highest feed speed is decided by multiplying the minimum quantity of the feed by the highest response frequency of the pulse motor. If the minimum quantity is 0.1 μm, the highest feed speed is 600 mm/min at most.

In a positioning system having the lead screw driven by a servomotor, a speed control of a motor driving circuit is limited in a small range and friction at various parts such as a table opposing the feeding motion. Accordingly, it is difficult to realize both a precise positioning and a high speed driving.

On the other hand, a reduction gear device is disposed between the motor and lead screw to obtain a minimum quantity of feed. However, the reduction gear device has backlashes. In case of a closed-loop control system, the backlashes cause an oscillation of the system, and in case of an opened-loop control system, the backlashes have influences on the accuracy of feeding, when the table returns. However, in a reduction gear device having small backlashes, it is hard to obtain a sufficient reduction gear ratio.

In a positioning system employed with a hydraulic cylinder, a maximum speed is decided by a rated flow rate of a servo valve and area of a piston, and a minimum quantity of feed is decided by a controllable minimum flow rate. Accordingly, it is difficult to provide a speedy and precise positioning.

SUMMARY OF THE INVENTION

The objectt of the present invention is to provide a positioning system which is capable of positioning at high speed with accuracy.

According to the present invention, there is provided a system for positioning a movable body comprising a lead screw rotatably and axially shiftably supported and engaged with the movable body so as to move it, a motor operatively connected to the lead screw for rotating it to move the movable body, a hydrostatic thrust bearing comprising a pair of opposed pockets for preventing axial movement of the lead screw, sensing means for sensing the position of the movable body and for producing a signal dependent on the position, and first means responsive to the signal for regulating the hydrostatic pressure applied to the pockets to axially move the lead screw, causing an axial movement of the movable body.

In an aspect of the present invention, the first means comprises a feedback control system for producing a control signal dependent on the difference between the signal and a desired value, and a second means responsive to the control signal for distributing the hydrostatic pressure applied to the pockets. The feedback control system operates to produce a first control signal for operating the motor, and then to produce a second control signal for operating the second means.

These and other objects and features of the present invention will become more apparent from the following description with reference to the accompanying drawings.

DESCRIPTION OF THE PREFERRED EMBODIMENTS

Figure 1:
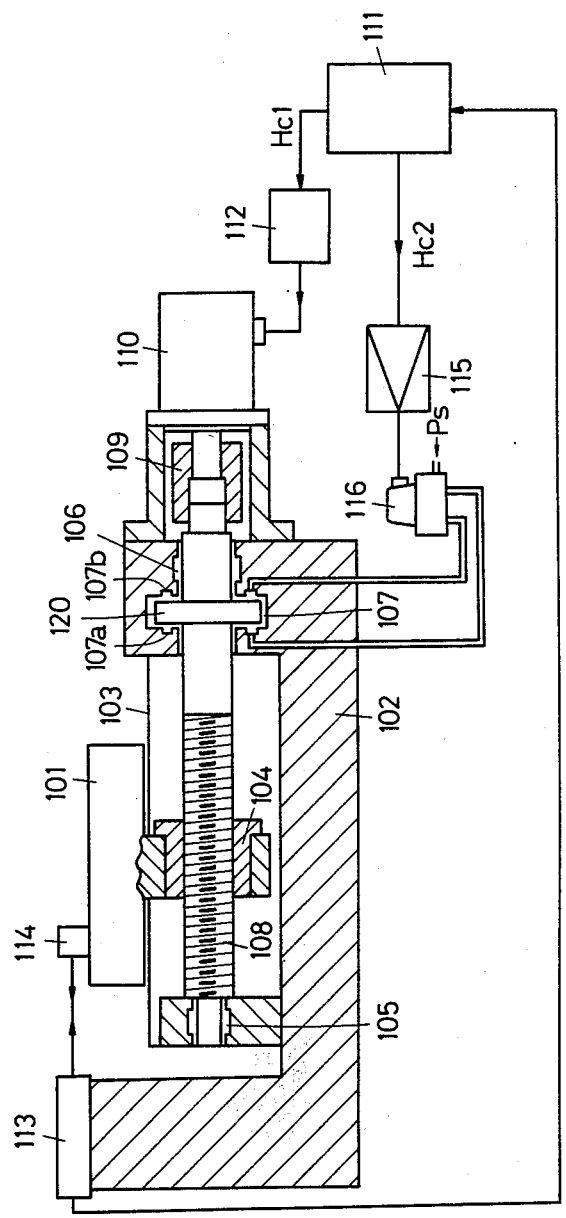
FIG. 1 is a schematic view showing a positioning system according to the present invention.

FIG. 1 shows a positioning system for a machine tool according to the present invention. The machine tool comprises a bed 102 for supporting the device, a table 101 slidably mounted on a guide surface 103 formed on the bed 102. A nut 104 secured to the table 101 is engaged with a lead screw 108 which is rotatably supported by hydrostatic radial bearings 105 and 106 so as to be permitted to move in the axial direction. The lead screw 108 has a flange 120 supported by a hydrostatic thrust bearing 107. The lead screw 108 is connected to a DC motor 110 through a coupling 109. The coupling 109 is adapted to allow a small amount of movement of the lead screw 108 in the axial direction. A motor driver 112 is provided for controlling the DC motor 110 in response to a command of a controller 111. The position of the table 101 is measured by a laser unit 113 provided on the bed 102 and a reflector 114 mounted on the table 101, and the output signal of the laser unit 113 is fed back to the controller 111. Further, a servo amplifier 115 is provided for amplifying the command of the controller 111, the output of which is applied to a servo valve 116. The servo valve 116 is provided for controlling pressure PS of oil supplied to opposed pockets 107a and 107b formed in the hydrostatic thrust bearing 107.

In operation, the controller 111 produces a control signal Hc1 responsive to a desired value (system command) for feeding the table 101. The control signal is applied to the motor driver 112, so that the DC motor 110 operates to rotate the lead screw 108 at a speed proportional to the control signal Hc1. Thus, the nut 104 is moved by the lead screw 108 to move the table 101 along the guide surface 103. The position of the table 101 is measured by the laser unit 113, so that a feedback signal is applied to the controller 111. The controller 111 compares the feedback signal with the desired value to change the control signal Hc1. When the difference between the position of the table 101 and the desired value becomes less than the minimum quantity of the feeding of the DC motor, the control signal Hc1 is set to zero to stop the motor.

Then, the controller 111 produces a control signal Hc2, which represents the difference between the desired value and the position of the table. The control signal is applied to the servo amplifier 115. (In this case, the difference between the desired value and the position of the table is less than the minimum quantity of the feeding of the DC motor.) The control signal Hc2 is amplified by the servo amplifier 115 and applied to the servo valve 116. The servo valve 116 operates to distribute the supply pressure PS applied to pockets 107a and 107b of the hydrostatic thrust bearing 107, so as to provide pressure difference therebetween proportional to the output of the servo amplifier 115. Accordingly, the lead screw 108 is moved towards the pocket having a lower pressure and the table 101 is moved in the same direction. The position of the table is measured by the laser unit 113 and the feedback signal is fed to the controller 111. When the table 101 reaches the desired position, the signal Hc2 becomes about zero, and the pressures in both pockets 107a and 107b are kept to respective values for maintaining the desired position of the table 101.

According to the present invention, the positioning of the table is roughly positioned by the DC motor. Then, a further fine positioning is performed by controlling the pressure to the hydrostatic thrust bearing. Thus, speedy and precise positioning can be performed. Further, since the position of the table is fed back, the precision of the table position is increased.

Figure 2:
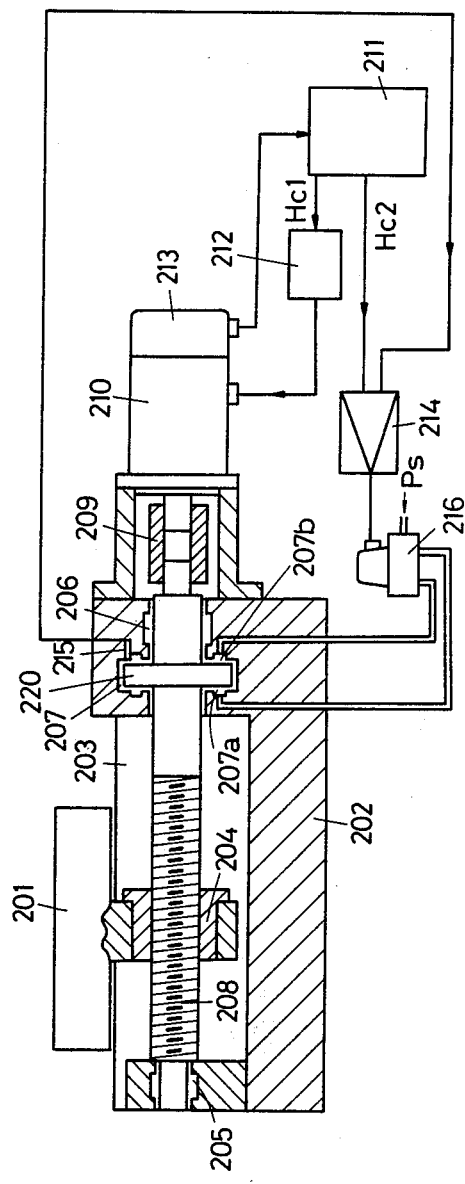
FIG. 2 is a schematic view showing another embodiment of the present invention.

FIG. 2 shows another embodiment of the present invention. A table 201 is slidably mounted on a guide surface 203 formed on a bed 202. A nut 204 is engaged with a lead screw 208 which is supported by hydrostatic radial bearings 205 and 206. The lead screw 208 has a flange 220 supported by a hydrostatic thrust bearing 207 like the first embodiment. The lead screw 208 is connected to a DC motor 210 through a coupling 209. A motor driver 212 is provided for controlling the DC motor 210 in response to a command to a controller 211. The DC motor 210 is provided with an encoder 213 which operates in synchronism with the rotation of the DC motor 210 for detecting the rotating angle of the DC motor 210, that is the position of the table. The output signal of the encoder 213 is fed back to the controller 211. A position sensor 215 is provided in the hydrostatic thrust bearing 207 for sensing the position of the flange 220, that is the position of the lead screw 208 in the axial direction. The output signal of the sensor is fed to a servo amplifier 214. The servo amplifier 214 is provided for amplifying the difference between the command of the controller 211 and the output of the position sensor 215 and producing an output which is applied to a servo valve 216.

The controller 211 produces a control signal Hc1 responsive to a desired value for feeding the table 201. The DC motor 210 operates to rotate the lead screw 208 to move the table 201. The position of the table 201 is detected by the encoder 213 and fed back to the controller 211. When the position of the table 201 reaches the desired value, the motor feeding operation finishes.

At the same time, the controller 211 produces a control signal Hc2, representing a feed quantity which is smaller than the minimum quantity of the feed by the DC motor 210, that is a quantity corresponding to a unit value divided by the encoder 213. The servo amplifier 214 amplifies the difference between the control signal Hc2 and the output of the position sensor 215. The output of the amplifier 214 is applied to the servo valve 216, so that the servo valve 216 operates to distribute the supply pressure PS to pockets 207a and 207b. Accordingly, the lead screw 208 is moved to the pocket having a lower pressure and the table 201 is moved in the same direction. The position of the table is detected by the position sensor 215 and fed back to the servo amplifier 214. The pressure difference in both pockets 207a and 207b are kept so as to equalize the control signal Hc2 with the output of the position sensor 215. When the control signal Hc2 becomes zero, the positioning is completed.

Although the present invention is described with respect to systems employed with the DC motor, other motors such as a pulse motor, or AC motor can be effectively employed.

In the embodiment shown in FIG. 1, in place of the laser unit, a linear scale such as a glass scale can be employed.

In the embodiment shown in FIG. 2, the position sensor 215 may be omitted. In this case, positioning can be performed by applying a pressure difference signal proportional to the control signal of the controller to the servo amplifier.

In accordance with the present invention, a speedy positioning is performed by a lead screw and a motor and a precise positioning is performed by controlling supply pressure applied to pockets of a hydrostatic thrust bearing. Furtner, it is possible to perform precise positioning without the reduction gear device necessary to the conventional precise positioning device employed with the motor and lead screw.

While the invention has been described in conjunction with preferred specific embodiments thereof, it will be understood that this description is intended to illustrate and not limit the scope of the invention, which is defined by the following claims.

What is claimed is:

1. A system for positioning a movable body slidably mounted on a bed, comprising:
   a lead screw rotatably and axially shiftably supported in said bed by bearings and engaged with said movable body through a nut so as to move it;
   a flange formed on the lead screw at an end portion thereof;
   a hydrostatic thrust bearing comprising a pair of opposed pockets formed in one of said bearings at both sides of said flange so as to prevent the axial movement of the lead screw;
   a motor operatively connected to said lead screw through a coupling so as to allow axial movement of said lead screw to rotate it to move said movable body;
   means including sensing means for sensing the position of the movable body and for producing a signal dependent on the position;
   a hydraulic circuit for applying hydrostatic pressure to the opposed pockets; and
   servo valve means provided in the hydraulic circuit and responsive to the signal for regulating the hydrostatic pressure applied to the pockets to axially move the lead screw, causing an axial movement of the movable body.

2. The system according to claim 1, wherein said servo valve means further comprises a feedback control system for producing a control signal dependent on the difference between the signal and a desired value.

3. The system according to claim 2, wherein said servo valve means is responsive to the control signal for distributing the hydrostatic pressure applied to said pockets.

4. The system according to claim 3, wherein said feedback control system operates to produce a first control signal for operating the motor, and then to produce a second control signal for operating the servo valve means.

5. The system according to claim 2, wherein said sensing means is a laser unit.

6. The system according to claim 2, wherein said sensing means is an encoder provided to detect a rotating angle of the motor.

7. The system according to claim 2, wherein said sensing means is a position sensor provided in one of said pockets for detecting the position of the flange of the lead screw.

* * * * *